United States Patent [19]

Saffold et al.

[11] Patent Number: 4,652,885

[45] Date of Patent: Mar. 24, 1987

[54] DUAL MODE ANTENNA FOR MILLIMETER WAVE AND INFRARED RADIATION

[75] Inventors: James A. Saffold; Augustus H. Green, Jr.; Ronald C. Passmore, all of Huntsville, Ala.

[73] Assignee: The United States of America as represented by the Secretary of the Army, Washington, D.C.

[21] Appl. No.: 708,124

[22] Filed: Mar. 4, 1985

[51] Int. Cl.[4] ........................ G01Q 21/28; G02B 5/16

[52] U.S. Cl. ............................ 343/725; 343/781 CA; 342/53

[58] Field of Search ................ 343/721, 725, 781 CA, 343/909, 6 ND; 350/96.10, 96.18

[56] References Cited

U.S. PATENT DOCUMENTS

| | | | |
|---|---|---|---|
| 3,521,288 | 7/1970 | Schell | 343/909 |
| 3,698,001 | 10/1971 | Koyama et al. | 343/909 |
| 4,247,858 | 1/1981 | Eichweber | 343/721 |
| 4,282,527 | 8/1981 | Winderman et al. | 343/725 |

*Primary Examiner*—Eli Lieberman

*Attorney, Agent, or Firm*—John C. Garvin, Jr.; Freddie M. Bush

[57] ABSTRACT

A dual mode antenna that allows both millimeter wave and infrared radiation to enter a single aperture and propagate through a common transmission device to a point where the respective energies are divided to follow separate paths for subsequent processing. An electromagnetic transmission guide or waveguide for the system comprises a tubular waveguide member, having a beam directing lens or lenses therein, for maintianing low-loss, gaussian beam propagation of millimeter wave energy therethrough. A waveguide fiber array is coupled into or adjacent to the tubular member at one end and retrieves the infrared radiation but allows the millimeter wave radiatin to pass. Cassegrainian optics are positioned adjacent the other end of the tubular member for directing incoming millimeter and infrared energy into the guide. Subsequently, the energy impinges on the beam directing lens means that separates the respective energies, dividing them into two separate and distinct paths.

6 Claims, 4 Drawing Figures

DUAL MODE ANTENNA FOR MILLIMETER WAVE AND INFRARED RADIATION

DEDICATORY CLAUSE

The invention described herein may be manufactured, used, and licensed by or for the Government for governmental purposes without the payment to us of any royalties thereon.

BACKGROUND OF THE INVENTION

In high frequency antenna or aperture systems wherein sensors are disposed for intercepting infrared or millimeter wave radiated energy, most sensors operate in either the infrared or the millimeter wave domain but not in both domains simultaneously. Thus, for a tracking or receiving system to detect intelligent electromagnetic radiation in these frequency bands, separate and distinct antenna or aperture systems are required.

SUMMARY OF THE INVENTION

A dual mode antenna/aperture system allows both millimeter wave (MMW) and infrared wave (IR) energies to enter a detection system by way of a single antenna or aperture and propagate through a common transmission guide to a point of separation where the energies are divided into independent channels for subsequent coupling to routine signal processing circuitry. The dual mode system uses well established cassegrainian optics in the antenna or aperture front end for directing incident energy into an electromagnetic transmission guide that contains a lens element for separating the two energies. The lens element includes a collector for infrared wavelengths but is transparent to millimeter waves, maintaining high transmission and low depolarization of millimeter wave radiation passing therethrough.

DESCRIPTION OF THE PREFERRED EMBODIMENT

Figure 1:
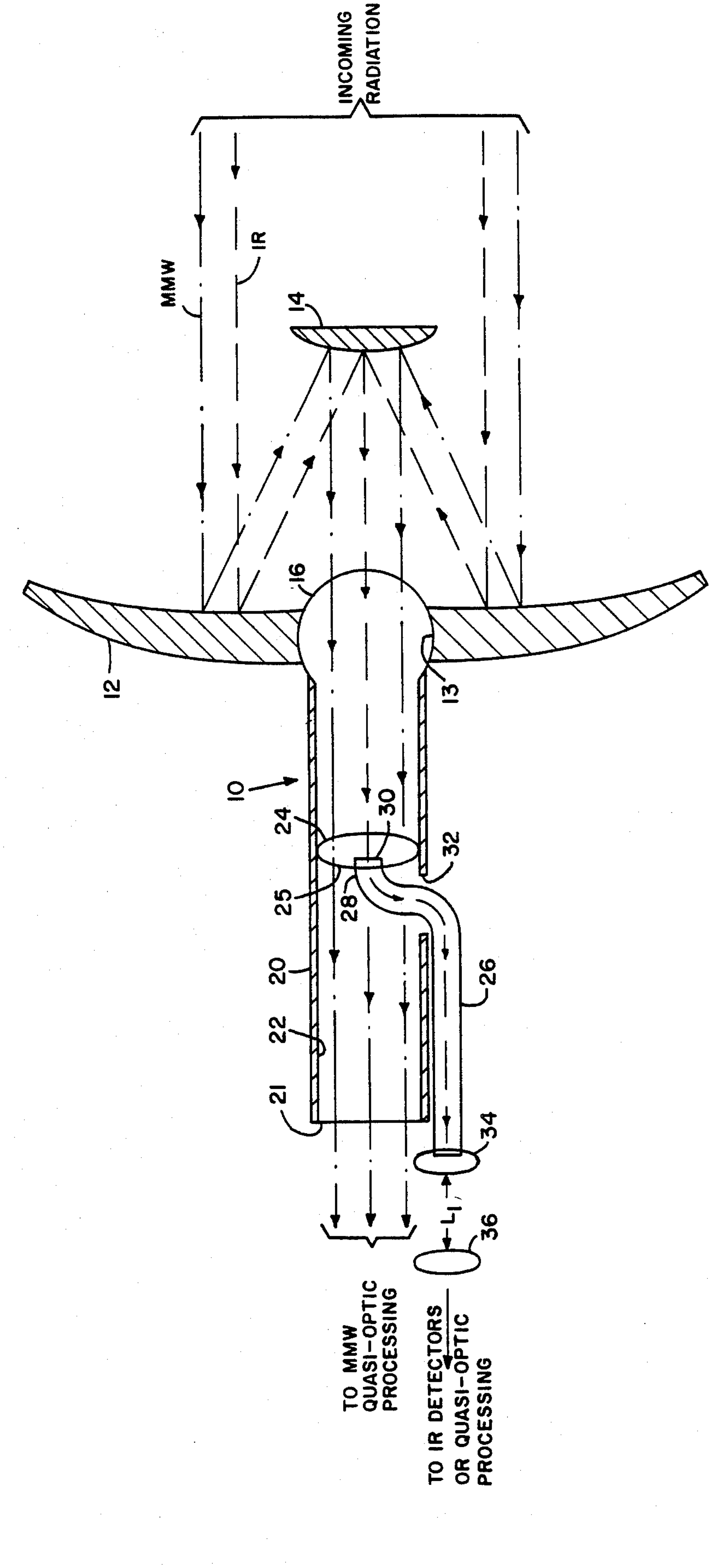
FIG. 1 is a schematic diagram of a preferred embodiment of the dual mode antenna/aperture.

Referring now to the drawings wherein like numbers represent like parts, the preferred embodiment of the antenna/aperture system is shown in schematic form, in FIG. 1. Mechanical support structures are well established for optical and electromagnetic signal processing components and, as such, are not shown since they do not contribute to an understanding of the invention. As shown in the schematic of FIG. 1, the dual mode antenna/aperture has a waveguide assembly 10 coupled to cassegrainian optics of a cassegrainian antenna system for receiving energy incident on the system. In the cassegrainian optics a primary reflector 12 and a secondary reflector 14 are shown for directing incoming incident energy into the electromagnetic waveguide 10. Reflectors 12 and 14 are machined to strict surface roughness tolerances. The subreflector 14 is hyperbolic. Particular limits on surface roughness of the reflectors depend on the particular type of antenna material used. Generally speaking, sigma ($\sigma$) is the RMS deviation of the reflector surface from an ideal paraboloid, and the maximum deviation from the ideal parabolic profile should be $\pm\lambda/32$, where $\lambda$ is the wavelength of the highest frequency used. This well established technology is discussed in detail in prior art texts, for example, see Chapter 10 of the "Radar Handbook" by M. I. Skolnik, published by McGraw-Hill Book Company in 1970.

A standard energy collecting radome 16 is disposed in an aperture 13 of primary reflector 12 through which incident energy is passed into the electromagnetic guide 10. Typically, transmission properties such as low loss tangent, non-depolarizing, and low transmission loss are required for the waveguide to satisfactorily pass both millimeter and infrared wavelengths. Typical structural properties of radome 16 include hardness and low water solubility. Radomes are discussed extensively in Chapter 14 of the "Radar Handbook" by M. I. Skolnik and in technical report TR-RE-84-21, "Preliminary Assessment of Dual Mode Millimeter Infrared Sensor Feasibility", authored by James A. Saffold, one of the co-inventors of the subject invention. This report, dated August 1984, was published by the U.S. Army Missile Command, Redstone Arsenal, Ala. Magnesium flouride, polydivinylbenzene, and monochlorotrifloroethylene are typical radome materials which include the desired transmission properties and structural properties.

The electromagnetic transmission guide 10 comprises a cylindrical transmission guide 20 having a reflective material coating 22 on the inside to enhance transmission of both millimeter wave (MMW) and infrared wave (IR) radiation therethrough, a lens element 24, and an infrared fiber element 26. Lens element 24 may be a magnesium flouride, polydivinylbenzene, and monochlorotrifloroethylene or other similar materials having acceptable propagation characteristics at both millimeter wave and infrared wave lengths. Lens 24 focuses the MMW gaussian beam into MMW quasi-optic processing circuitry (not shown) coupled to an output end 21 of tube 20 while exhibiting low loss to IR radiation.

IR fiber array 26 is a bundle of tiny fibers, which may be arsenic sesquasulfide, having and end portion 28 coupled to the back surface 25 of lens element 24. The IR fibers of array 26 are band limited fibers and effectively collect the IR radiant energy while maintaining transparency at millimeter wavelengths. A dielectric impedance matching material 30 such as plastics or polytetrafluoroethlene are used to bond or mount these fibers to the rear of the lens. Fiber array 26 is coupled out of the chamber of tube 20 via port 32.

Upon collection of the infrared energy into the fiber bundle array, low loss propagation into IR detector circuitry (not shown) can be realized. The IR fiber link can be extended and coupled directly to an infrared detector array for subsequent detection of IR radiation or if quasi-optical propagation is desired fiber array or bundle 26 may be coupled to a lens element 34 which is identical to lens 24 in construction. Another lens 36 is placed an adjustable distance $L_1$ from lens element 34 such that the elements are confocal to the IR energy directed therebetween. This allows for good gaussian beam propagation and low spillover.

Figure 2:
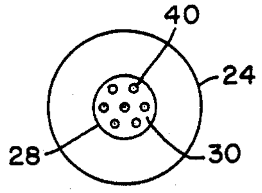
FIG. 2 is an end view of the lens element that separates the two beams.

FIG. 2 is a typical view of the lens element 24 (and 34), showing the ends of the fiber bundle or array attached to the back side of the lens in a staring focal plane array. In the end view each circle 40 indicates a tiny infrared fiber which provides an instantaneous IR field of view.

Of course, the field-of-view (FOV) requirements for the MM wave system and the IR system sharing a common aperture are physical size and application dependent. Whether or not it is necessary that the two systems obtain the same amount of area coverage within the seeker footprint must be specified by the user. However, in order to provide some insight into the large FOV differences between the two technologies, the instantaneous FOV obtained from a 0.15 millimeter diameter fiber at 3-5 microns is of the order of 1 milliradian; whereas, if the fibers were placed within a 4 inch diameter antenna aperture (for example), the millimeter wave IFOV would be on the order of 37 milliradians at 94 gigahertz. Therefore, the quantity or number of circles (fiber IFOV's) must be sufficient to meet total FOV requirements compatable with the system application. Since the lens element 24, band limited IR fibers 26, and plastic material present within tube 20 are transparent at MMW frequencies, the MMW directed through tube 20 passes through with negligible interference. Should MMW leakage occur around port 32 and to a non-negligible degree through fiber bundle 26, the effects of any leakage are eliminated by composing lens element 34 of a material that propagates only IR, not MMW. One material is zinc sulfide, which propagates 8-14 microns but does not propagate MMW.

Figure 3:
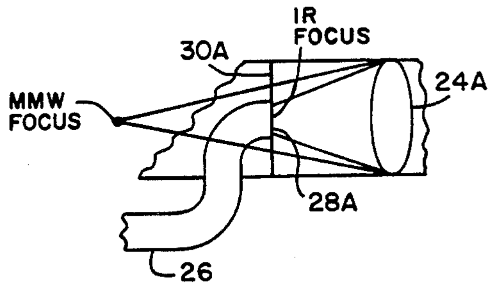
FIG. 3 is a schematic of an alternative lens composite for separating the two beams.

FIG. 3 discloses an alternative embodiment to the lens structure of FIG. 1 wherein a lens 24A replaces the lens element 24 and the fiber bundle 26 terminates in a plastic support 30A to again place the IR fiber ends in a staring focal plane array fashion. However, this fiber end 28A focal plane, which may be considered to be in the same plane as plastic plate 30A, is placed an adjustable distance behind lens 24A at the focal plane for that lens for infrared radiation. The millimeter wave focal point or plane lies even farther away from lens 24A than the IR focal plane, due to chromatic aberration. In both FIG. 1 and FIG. 3 the staring surface of the fiber array is centered on the longitudinal axis of tube 20, facing incoming radiation.

Figure 4:
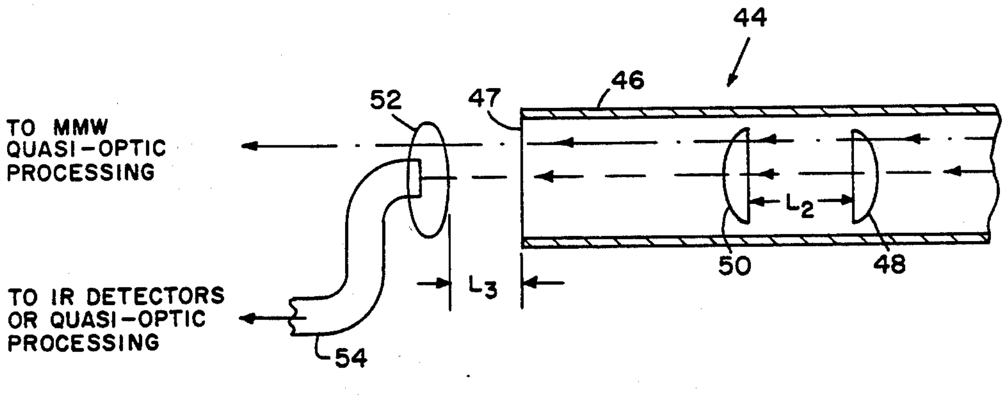
FIG. 4 is an enlarged sectional view of an alternative embodiment of FIG. 1.

Alternatively, as shown in FIG. 4, incoming radiation of millimeter wave and infrared wave energy may be directed through the cassegrainian optics and radome as noted for FIG. 1 and further coupled into an electromagnetic transmission guide 44 in the same manner as it is coupled to the guide 10 of FIG. 1. However, signal processing is different in that separation of the IR and MMW beams are different. Transmission guide 44 has a tube 46 that is also coated with a reflective inner coating. First and second achromaticized lenses 48 and 50 function as a lens transducer system. Lenses 48 and 50 exhibit the same transmission properties that are attributed to lens element 24 in FIG. 1. However these lenses are separated a distance $L_2$ to create a lens-pair transducer system, which allows adjustment in the system for energy abberration in the dual band focal plane. A lens element 52 is located coaxially with tube 46 a predetermined distance $L_3$ outside the terminal end portion 47 of tube 46. The transducer pair 48-50 focus the IR and MMW energy at lens element 52. The distance $L_3$ is adjusted with lenses 48 and 50 to provide this focus and may also be adjusted for optimum energy collection at lens 52.

An infrared fiber array link 54 is coupled to the back of lens 52 in the same manner that fiber array 26 is coupled to lens 24 of FIGS. 1 and 2. The quantity of fibers used in the fiber array link is also determined by system application and optimization. The fibers of fiber arrays 26 and 54 are mounted to their respective lens elements and are fused into the anti-reflective coating on the lens element itself. This fusing leaves no gap between the fiber and the lens.

The electromagnetic transmission guide, comprising of the unique lens elements and fiber optics, provides an antenna/aperture capability for simultaneous reception of millimeter wave and infrared wave energy in a single antenna with subsequent separation of the infrared from the millimeter waves.

While the system has been described with emphasis on reception of incoming radiation, it is apparent to those skilled in the art that radiation can be directed in the opposite direction through the system with the antenna/aperture functioning as a transmitting system as well as a receiving system. In continuous transmit-receive optical communication systems, high data rates can be handled. Inputs or outputs from an optical system are well established in the art and since the invention does not involve these areas such are not disclosed.

A related dual mode system is disclosed in a copending application Ser. No. 708,123 entitled "Dual Mode Dichroic Antenna/Aperture" filed by J. A. Saffold, A. H. Green, Jr., and R. C. Passmore. This copending application was filed simultaneously with the subject application by applicants and is assigned to the U.S. Government as represented by the Department of the Army.

Although the present invention has been described with reference to a preferred embodiment, workers skilled in the art will recognize that changes may be made in form and detail without departing from the spirit and scope of the foregoing disclosure. Accordingly, the scope of the invention should be limited only by the claims appended hereto.

We claim:

1. An electromagnetic energy transmission system for transmission of millimeter wave and infrared electromagnetic energy comprising: a waveguide housing for simultaneously guiding both millileter wave and infrared radiation therein, said waveguide housing having first, second, and third ports for coupling energy to and from said guide; beam directing means disposed within said housing for directing said energy selectively between said first port and said second and third ports; said beam directing means being a lens and a waveguide fiber bundle, a first end of said bundle being disposed in staring array in a focal plane of said lens remote from said parallel to said lens, the lens being disposed between said waveguide bundle and said first port; said lens and said end of the waveguide bundle selectively directing impinging infrared energy along a path defined by said bundle while being transparent to impinging millimeter waves; said first and second ports being coaxial and said third port being normal to the axis of said second and first ports, said fiber bundle being coupled through said third port for coupling infrared energy therethrough, said second port being transparent to millimeter wave energy, and said first port being transparent to both millimeter wave and infrared radiation.

2. An electromagnetic energy transmission system as set forth in claim 1 and further comprising a radome covering said first port for sealing the housing end to external environment and coupling electromagnetic radiation into the port, and cassegrainian optics coaxially aligned with said first port for directing millimeter wave and infrared radiation between the port and the optics along a substantially common path.

3. An electromagnetic energy transmission system for millimeter wave and infrared radiation comprising: an elongated waveguide housing having first and second ports for coupling both millimeter wave and infrared radiation into and out of the housing, beam focusing means disposed within the housing for simultaneously directing both millimeter wave and infrared radiation through the housing with a gaussian distribution, and beam directing means adjacent the second port of said housing, externally thereof, for establishing first and second separate paths respectively for said millimeter wave radiation and said infrared radiation when said radiation is passed through said housing exiting said second port.

4. An electromagnetic energy transmission system for millimeter wave and infrared radiation as set forth in claim 3 wherein said beam directing means comprises a lens element and an infrared fiber waveguide bundle, said bundle having one end attached to one surface of said lens element to provide a staring plane fiber array centered along the axis of said lens element, said lens element and bundle being transparent to millimeter wave energy and opaque to infrared energy for collecting and redirecting the path of infrared radiation impinging on said beam directing means.

5. An electromagnetic energy transmission system as set forth in claim 4 and further comprising a radome covering said first port of said housing, and cassegrainian optics coaxially aligned with said first port for directing radiation between the port and the optics along a common path.

6. An electromagnetic energy transmission system for transmission of millimeter wave and infrared electromagnetic energy comprising: a waveguide housing for simultaneously guiding both millimeter wave and infrared radiation therein, said waveguide housing having first, second, and third ports for coupling energy to and from said guide; beam directing means disposed within said housing for directing said energy selectively between said first port and said second and third ports, said beam directing means being a lens member and a waveguide fiber bundle one end of the bundle being attached to the lens means to form a staring focal plane fiber array thereon, said lens member and bundle being transparent to millimeter wave energy and opaque to infrared energy for collecting and redirecting infrared energy impinging on said array and lens member and said staring focal plane array being aligned facing said first port, the other or second end of the bundle being disposed for directing infrared radiation therethrough, said first and second ports being coaxial and said third port being normal to the axis of said first and second ports; said second port being transparent to millimeter wave energy for coupling said energy therethrough, and said first port being transparent to both millimeter wave and infrared radiation; and a lens assembly coupled to the second end of the fiber bundle for redirecting infrared radiation passing through said second fiber bundle end.

* * * * *